United States Patent
Harada et al.

(10) Patent No.: US 12,216,081 B2
(45) Date of Patent: Feb. 4, 2025

(54) MICROCHIP ELECTROPHORESIS DEVICE

(71) Applicant: SHIMADZU CORPORATION, Kyoto (JP)

(72) Inventors: Akira Harada, Kyoto (JP); Kota Ogino, Kyoto (JP); Hidesato Kumagai, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 83 days.

(21) Appl. No.: 17/569,971

(22) Filed: Jan. 6, 2022

(65) Prior Publication Data

US 2022/0236220 A1    Jul. 28, 2022

(30) Foreign Application Priority Data

Jan. 27, 2021 (JP) .................. 2021-011103

(51) Int. Cl.
*G01N 27/447* (2006.01)

(52) U.S. Cl.
CPC . *G01N 27/44791* (2013.01); *G01N 27/44743* (2013.01); *G01N 27/44782* (2013.01)

(58) Field of Classification Search
CPC ....... G01N 27/44791; G01N 27/44743; G01N 27/44782
See application file for complete search history.

(56) References Cited

U.S. PATENT DOCUMENTS

2006/0073503 A1* 4/2006 Maeda .................. C12Q 1/686
                                                             435/6.14
2007/0175757 A1* 8/2007 Hanafusa ......... G01N 27/44756
                                                             204/601

(Continued)

FOREIGN PATENT DOCUMENTS

JP    2007225420 A  *  9/2007
JP    2013-195139 A     9/2013

(Continued)

OTHER PUBLICATIONS

Öztekin, Simultaneous determination of benzoic acid and sorbic acid in food products by capillary electrophoresis, Food and Health, 2018, 4(3), 176-182 (Year: 2018).*

(Continued)

*Primary Examiner* — Brian W Cohen
*Assistant Examiner* — Shizhi Qian
(74) *Attorney, Agent, or Firm* — Paratus Law Group, PLLC (57) ABSTRACT

A sample setting section in which at least one sample to be subjected to electrophoresis analysis and at least one standard sample are set, and a controller. The controller includes a standard data storage memory that stores standard data obtained by performing electrophoresis analysis of a standard sample under a predetermined condition, and a chip determination part configured to perform electrophoresis analysis of the standard sample under the predetermined condition using each of the at least one microchip before electrophoresis analysis of the sample set in the sample setting section is performed to acquire analysis data on the standard sample by the detector, and to perform a chip determination as to whether a state of each of the at least one microchip is suitable for performing electrophoresis analysis by comparing the acquired analysis data with the standard data on the standard sample.

5 Claims, 5 Drawing Sheets (56) References Cited

U.S. PATENT DOCUMENTS

| | | | | |
|---|---|---|---|---|
| 2014/0238444 A1* | 8/2014 | Arai | ............... | C11D 7/5013 |
| | | | | 510/109 |
| 2015/0154350 A1* | 6/2015 | Pritzker | ............... | C12Q 1/68 |
| | | | | 514/459 |
| 2019/0019290 A1* | 1/2019 | Tan | ............... | G16B 20/20 |
| 2020/0256830 A1 | 8/2020 | Arai | | |
| 2022/0229015 A1 | 7/2022 | Kumagai et al. | | |

FOREIGN PATENT DOCUMENTS

| | | | |
|---|---|---|---|
| JP | 2020-128904 A | | 8/2020 |
| WO | WO1996029595 A1 | * | 9/1996 |
| WO | WO 2020/235129 A1 | | 11/2020 |

OTHER PUBLICATIONS

Agilent Technologies, High performance capillary electrophoresis: A primer, https://www.agilent.com/Library/primers/Public/5990-3777EN.pdf, Mar. 8, 2016 (Year: 2016).*

Shimadzu, Microchip Electrophoresis System for DNA/RNA Analysis, MCE-202 MultiNA Instruction Manual, Mar. 2013 (Year: 2013).*

Apr. 24, 2023, Chinese Office Action issued for related CN Application No. 202210010674.4.

Jan. 30, 2024, Japanese Office Action issued for related JP Application No. 2021-011103.

Oct. 26, 2023, Chinese Office Action issued for related CN Application No. 202210010674.4.

Jul. 4, 2024, Chinese Reexamination Notice issued for related CN Application No. 202210010674.4.

* cited by examiner

SAMPLE REGISTRATION SCREEN

| WELL | SAMPLE NAME | TYPE | SEPARATION BUFFER | CHIP |
|---|---|---|---|---|
| 1 | X1 | - - - | STANDARD | DNA-1000 | 1 |
| 2 | X2 | - - - | STANDARD | DNA-1000 | 2 |
| 3 | X3 | - - - | STANDARD | DNA-1000 | 3 |
| 4 | X4 | - - - | STANDARD | DNA-1000 | 4 |
| 5 | A1 | - - - | SAMPLE | DNA-1000 | 1 |
| 6 | B1 | - - - | SAMPLE | DNA-1000 | 2 |
| 7 | C1 | - - - | SAMPLE | DNA-1000 | 3 |
| 8 | E1 | - - - | SAMPLE | DNA-1000 | 4 |
| 9 | F1 | - - - | | DNA-1000 | 1 |

FIG. 4

(A) STANDARD SAMPLE: FOR DNA-1000, SEPARATION BUFFER: DNA-1000

(B) STANDARD SAMPLE: FOR DNA-1000, SEPARATION BUFFER: DNA-500

(C) STANDARD SAMPLE: FOR DNA-1000, SEPARATION BUFFER: DNA-12000

FIG. 5

(A) STANDARD SAMPLE: FOR DNA-1000, SEPARATION BUFFER: DNA-1000

(B) STANDARD SAMPLE: FOR DNA-1000, SEPARATION BUFFER: DNA-500

(C) STANDARD SAMPLE: FOR DNA-1000, SEPARATION BUFFER: DNA-12000

MICROCHIP ELECTROPHORESIS DEVICE

CROSS REFERENCE TO PRIOR APPLICATION

This application claims priority to Japanese Patent Application No. 2021-011103 (filed on Jan. 27, 2021), which is hereby incorporated by reference in its entirety.

BACKGROUND OF THE INVENTION

1. Field of the Invention

The present invention relates to a microchip electrophoresis device.

2. Description of the Related Art

A microchip electrophoresis device that performs electrophoresis analysis using a microchip is known (see JP 2020-128904 A). In the microchip electrophoresis device, a plurality of microchips can be set, and electrophoresis analysis of a large number of samples can be performed simultaneously in parallel using the plurality of microchips.

SUMMARY OF THE INVENTION

In the microchip electrophoresis device, when the performance of the microchip is deteriorated or an error occurs in the separation buffer with which the microchip is filled, correct analysis data cannot be acquired when electrophoresis analysis is performed using the microchip. However, until now, it has often been noticed that such a problem has occurred only after verifying analysis data obtained by performing electrophoresis analysis of a sample, and in such a case, there has been a problem that time and a sample are wasted by acquiring incorrect analysis data.

The present invention has been made in view of the above problems, and an object thereof is to prevent electrophoresis analysis from being performed using a microchip in a state unsuitable for use in electrophoresis analysis.

A microchip electrophoresis device according to the present invention includes a sample setting section in which at least one sample to be subjected to electrophoresis analysis and at least one standard sample are set, at least one microchip having a flow path for electrophoresis therein, an introduction device that introduces a separation buffer, the sample, and the standard sample into the flow path in the microchip, a voltage application device that applies a voltage to the flow path in the microchip, a detector that acquires analysis data by electrophoresis analysis in the flow path of the microchip, and a controller that controls operations of the introduction device and the voltage application device. Then, the controller includes a standard data storage memory that stores standard data obtained by performing electrophoresis analysis of a standard sample under a predetermined condition, and a chip determination part configured to perform electrophoresis analysis of the standard sample analysis under the predetermined condition using each of the at least one microchip before electrophoresis analysis of the sample set in the sample setting section is performed to acquire analysis data on the standard sample by the detector, and to perform a chip determination as to whether a state of each of the at least one microchip is suitable for performing electrophoresis analysis by comparing the acquired analysis data with the standard data on the standard sample.

In the microchip electrophoresis device according to the present invention, the controller stores standard data obtained by performing electrophoresis analysis of a standard sample under a predetermined condition, and before the electrophoresis analysis of the sample is performed, the controller is configured to perform the electrophoresis analysis of the standard sample under the predetermined condition using each of the at least one microchip to acquire analysis data, and compare the acquired analysis data with the standard data to determine whether the state of each of the at least one microchip is suitable for performing the electrophoresis analysis, so that it is possible to prevent the electrophoresis analysis from being performed using the microchip in a state not suitable for performing the electrophoresis analysis.

DETAILED DESCRIPTION OF THE INVENTION

Hereinafter, an embodiment of a microchip electrophoresis device according to the present invention will be described with reference to the drawings.

Figure 1:
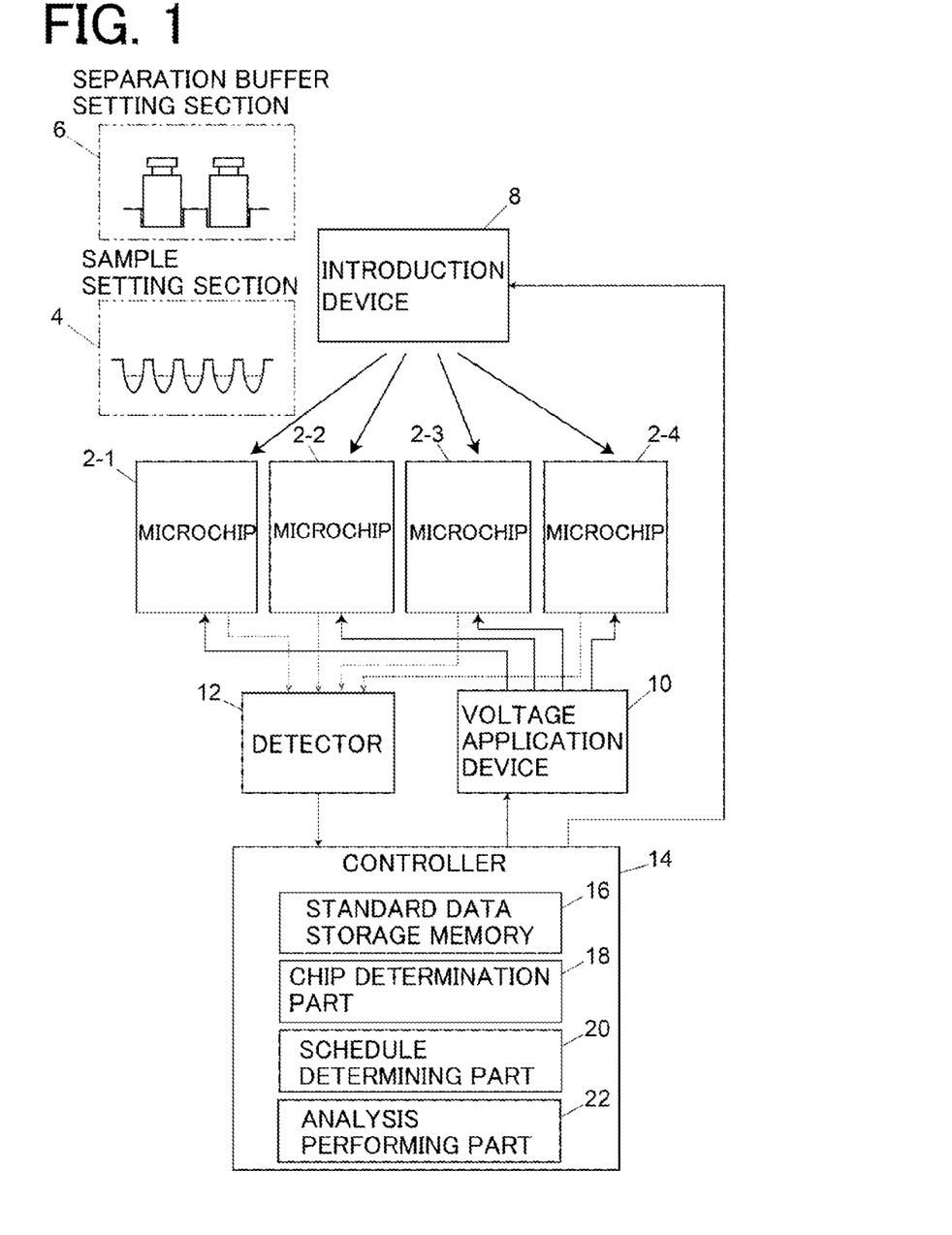
FIG. 1 is a schematic configuration diagram showing an embodiment of a microchip electrophoresis device.

As illustrated in FIG. 1, the microchip electrophoresis device of the embodiment includes a plurality of microchips 2-1 to 2-4, a sample setting section 4, a separation buffer setting section 6, an introduction device 8, a voltage application device 10, a detector 12, and a controller 14. Although not illustrated, each of the microchips 2-1 to 2-4 includes a flow path for performing electrophoresis inside, and ports leading to both ends of the flow path on the upper face. Note that, in the embodiment, four microchips 2-1 to 2-4 are provided, but the present invention is not limited thereto, and one or more microchips may be provided.

In the sample setting section 4, one or more samples to be subjected to electrophoresis analysis and one or more standard samples for indicating a standard of sizes of components in the samples are set. The sample and the standard sample are placed in a state of being accommodated in a well provided in the well plate.

In the separation buffer setting section 6, one or more types of separation buffers are set in a state of being accommodated in a container.

The introduction device 8 is a device that includes a dispensing probe and a suction nozzle and introduces a sample, a standard sample, and a separation buffer into the microchips 2-1 to 2-4. Although illustration of a specific configuration of the introduction device 8 is omitted here, for example, a configuration equivalent to the configuration disclosed in JP 2020-128904 can be used.

The voltage application device 10 is a device for applying a voltage to both ends of each of the flow paths of the microchips 2-1 to 2-4 to introduce a sample and perform electrophoresis of the sample.

The detector 12 optically detects components separated by electrophoresis in the respective flow paths of the microchips 2-1 to 2-4. The detector 12 includes, for example, an excitation light source that irradiates the fluorescently stained component with excitation light, and an optical sensor that detects fluorescence emitted from the excited fluorescent dye.

The controller 14 controls the operations of the introduction device 8 and the voltage application device 10, and performs various arithmetic processing based on the detection signal acquired by the detector 12. The controller 14 can be realized by one or a plurality of computer devices including a central processing unit (CPU) and an information storage device.

The controller 14 includes a standard data storage memory 16, a chip determination part 18, a schedule determining part 20, and an analysis performing part 22. The standard data storage memory 16 is a function realized by a partial storage area of the information storage device, and the chip determination part 18, the schedule determining part 20, and the analysis performing part 22 are functions realized by the CPU executing a predetermined program.

The standard data storage memory 16 stores, as standard data, analysis data obtained by previously performing electrophoresis analysis on a standard sample under a predetermined condition. There is a plurality of types of separation buffers such as DNA-500, DNA-1000, and DNA-12000, and there is a standard sample corresponding to each type of separation buffer. The standard data storage memory 16 stores, as standard data of each standard sample, analysis data acquired under a predetermined condition (predetermined applied voltage or the like) using a corresponding separation buffer for each standard sample. The standard data can include the number of errors, the number of warnings, the low molecular marker time, the high molecular marker time, the low molecular marker height, the high molecular marker height, the current value of each port at the time of loading, the current value of each port at the time of electrophoretic separation, the baseline height, the theoretical number of polymer marker stages, the noise amplitude, and the like. Further, the standard data can include the appearance time of each peak in the electropherogram and/or the number of peaks in the electropherogram.

The chip determination part 18 is configured to perform, before the electrophoresis analysis of the sample is started, the electrophoresis analysis of the standard sample in the microchips 2-1 to 2-4 to acquire analysis data on the standard sample, and compare the acquired analysis data with the standard data stored in the standard data storage memory 16 to perform the chip determination as to whether the state of each of the microchips 2-1 to 2-4 is suitable for use in the electrophoresis analysis of the sample. In the chip determination, each item of the analysis data obtained by the electrophoresis analysis of the standard sample is compared with each item of the standard data, and it is determined whether the deviation is within an allowable range. For example, it is determined whether the relative deviation between the position of each peak in the electropherogram of the analysis data and the position of each peak in the electropherogram of the standard data is within an allowable range, and when the relative deviation is out of the allowable range, it is determined that the microchip is unusable (not suitable for use in electrophoresis analysis). In addition, when the number of peaks in the electropherogram of the analysis data does not match the number of peaks in the electropherogram of the standard data, the microchip is determined to be unusable.

The schedule determining part 20 determines the analysis schedule so that the electrophoresis analysis of the sample is performed using the microchip determined to be suitable for use in the electrophoresis analysis of the sample by the chip determination part 18 among the microchips 2-1 to 2-4. The analysis schedule defines in what order the plurality of samples are subjected to electrophoresis analysis using which microchip and under what conditions.

In the embodiment, the analysis schedule is provisionally created at the time of sample registration to the controller 14. When the chip determination part 18 determines that all of the microchips 2-1 to 2-4 are suitable for use in the electrophoresis analysis of the sample, the schedule determining part 20 determines the analysis schedule provisionally created at the time of sample registration can be used as it is. On the other hand, when the chip determination part 18 determines that any of the microchips 2-1 to 2-4 is not suitable for use in the electrophoresis analysis of the sample, the schedule determining part 20 reassembles and determines the analysis schedule so that the electrophoresis analysis of the sample is performed using only the microchip(s) determined to be suitable for use in the electrophoresis analysis.

The analysis performing part 22 is configured to perform the electrophoresis analysis of the sample according to the analysis schedule determined by the schedule determining part 20.

Figure 2:
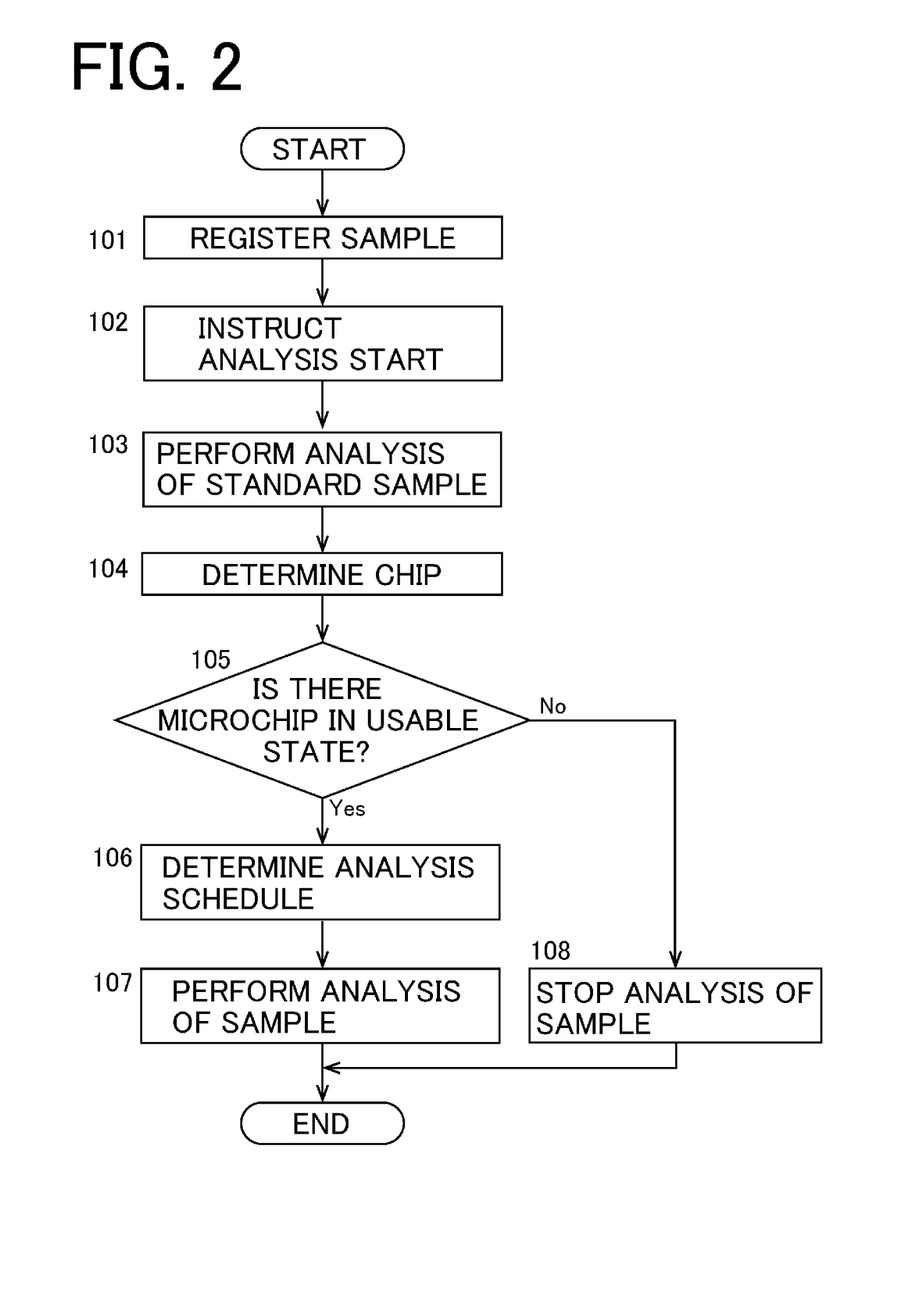
FIG. 2 is a flowchart for explaining an example of an operation of the embodiment.

An example of the operation of the embodiment will be described with reference to the flowchart of FIG. 2 together with FIG. 1.

First, sample registration to the controller 14 is performed (step 101). The sample registration is performed on a sample registration screen displayed on a display (not illustrated) communicable with the controller 14.

Figure 3:
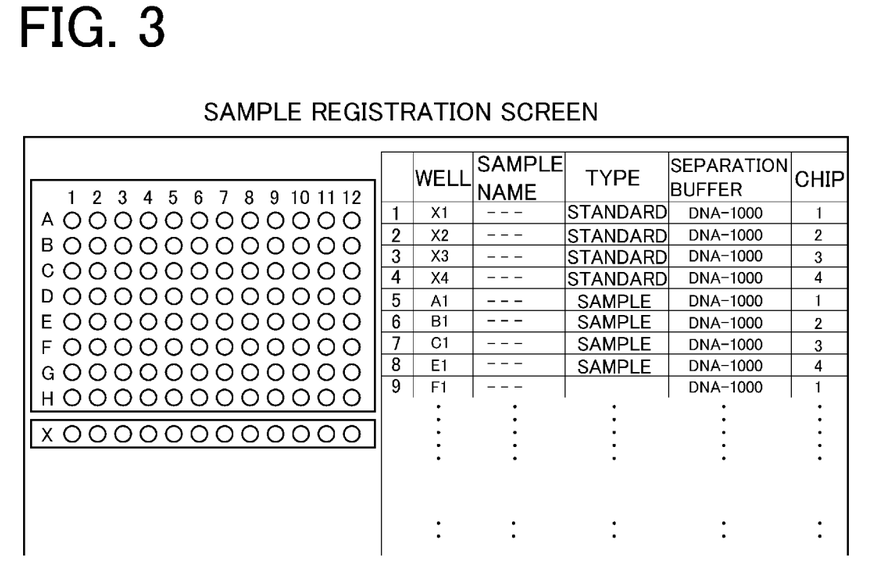
FIG. 3 is a diagram illustrating an example of a sample registration screen in the embodiment.

FIG. 3 is an example of a sample registration screen. On the left side of the sample registration screen, a well plate containing a sample or a standard sample in each well is displayed, and on the right side, registration information indicating in what order, which microchip (chip), and which type of separation buffer is used to perform electrophoresis of the sample or the standard sample contained in each well of the well plate is displayed as an analysis schedule. The analysis schedule of the sample can be arbitrarily determined by the user. The analysis schedule of the standard sample may be automatically registered before the analysis schedule of the sample, or may be displayed to prompt the user to perform such registration.

When sample registration is completed and the user inputs an instruction to start analysis to the controller 14 (step 102), the chip determination part 18 performs electrophoresis analysis of a standard sample in each of the microchips 2-1 to 2-4 (step 103) to acquire analysis data on the standard sample in each of the microchips 2-1 to 2-4. Then, the chip determination part 18 compares each analysis data with the corresponding standard data stored in the standard data storage memory 16 to determine whether the state of each of the microchips 2-1 to 2-4 is suitable for use in the electrophoresis analysis (step 104).

As a result of the chip determination by the chip determination part 18, in a case where there is a microchip that can be used for the electrophoresis analysis of the sample (step 105: Yes), the schedule determining part 106 determines an analysis schedule in which the electrophoresis analysis of the sample is performed using only the usable microchip (step 106). The analysis performing part 22 performs electrophoresis analysis of the sample according to the analysis schedule determined by the schedule determining part 20 (step 107).

On the other hand, when the chip determination part 18 determines that all the microchips are unusable for the electrophoresis analysis of the sample (step 105: No), the analysis of the sample is stopped (step 108). When the analysis of the sample is stopped, replacement of the microchip, check of the set position of the separation buffer, and the like may be prompted by issuing a warning or the like to the user.

As described above, before the electrophoresis analysis of the sample is started, the chip determination as to whether each of the microchips 2-1 to 2-4 is usable for the electrophoresis analysis is performed, and the analysis schedule is determined by excluding the microchip(s) in the unusable state. Therefore, it is possible to prevent useless electrophoresis analysis from being performed using the microchip(s) in the unusable state.

In addition, in the chip determination, by evaluating the correlation between the peak positions in the electropherogram and/or comparing the number of peaks, it is possible to detect a decrease in the performance of the microchip or an error such as a mistake in the separation buffer.

Figure 4:
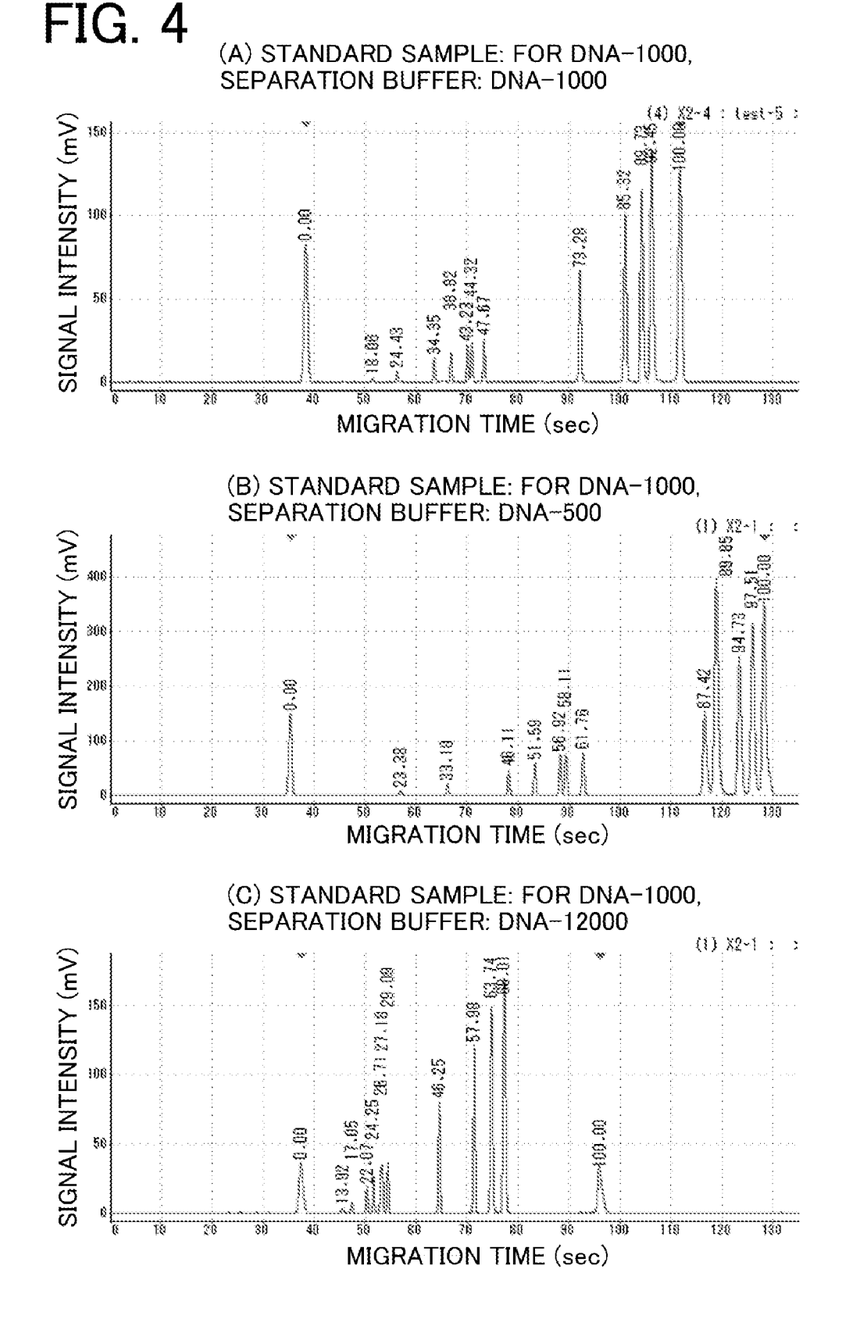
FIG. 4 is an example of an electropherogram for explaining a relationship between a type of a separation buffer and analysis data of a standard sample.
Figure 5:
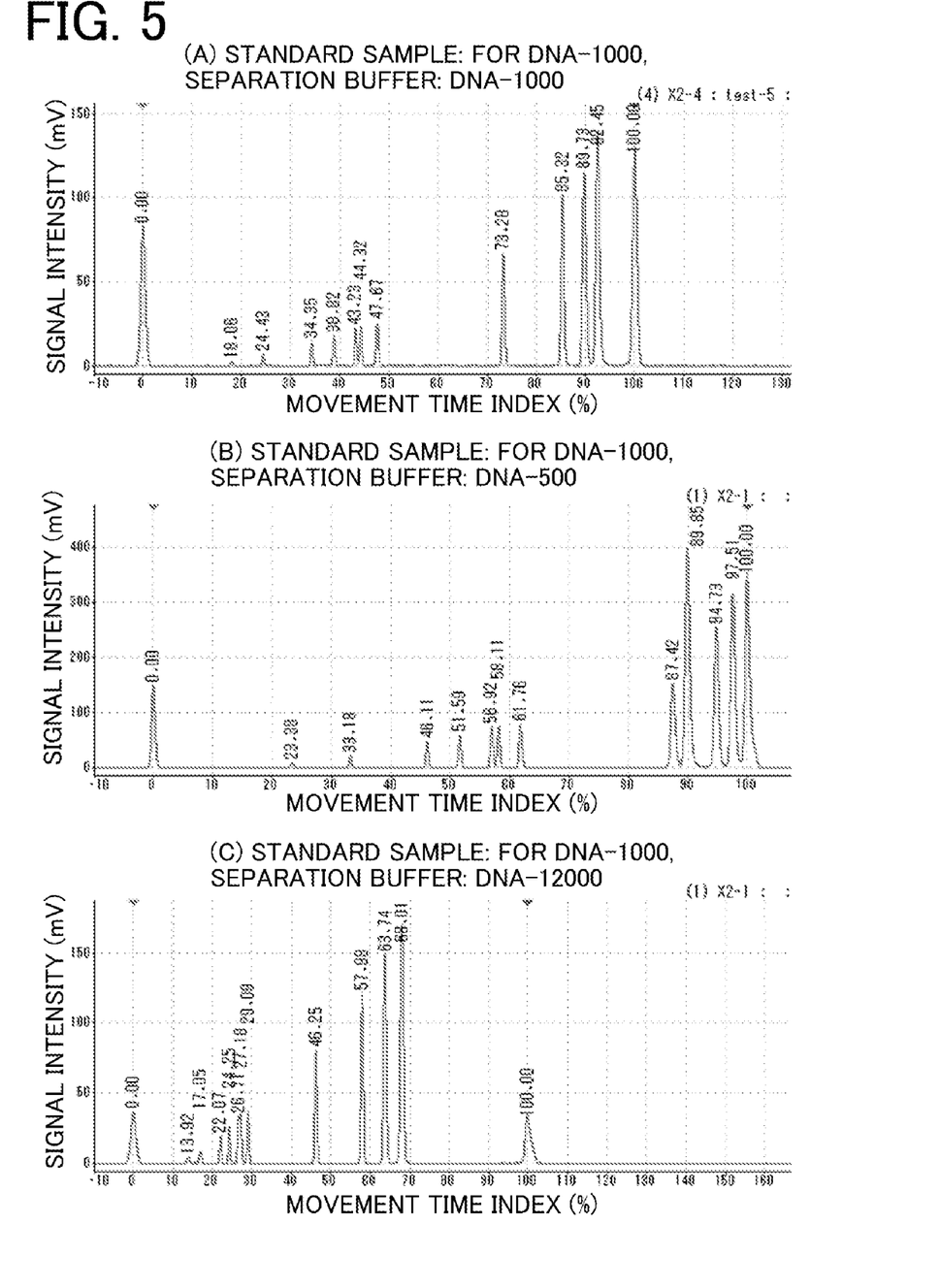
FIG. 5 is an example of an electropherogram for explaining a relationship between a type of a separation buffer and analysis data of a standard sample.

FIGS. 4 and 5 are verification results of the relationship between the combination of the standard sample and the separation buffer and the peak position. FIGS. 4(A) and 5(A) are electropherograms when a standard sample for DNA-1000 is subjected to electrophoresis analysis using DNA-1000 (separation buffer), FIGS. 4(B) and 5(B) are electropherograms when a standard sample for DNA-1000 is subjected to electrophoresis analysis using DNA-500 (separation buffer), and FIGS. 4(C) and 5(C) are electropherograms when a standard sample for DNA-1000 is subjected to electrophoresis analysis using DNA-12000 (separation buffer). In FIG. 4, the horizontal axis represents the migration time (seconds), and the vertical axis represents the signal intensity (mV). In FIG. 5, the horizontal axis represents the movement time index (%), and the vertical axis represents the signal intensity (mV).

Comparing (A) to (C) in FIGS. 4 and 5, when the standard sample for DNA-1000 is subjected to the electrophoresis analysis using DNA-500, each peak position is delayed as compared with the case where the standard sample for DNA-1000 is subjected to the electrophoresis analysis using DNA-1000, and when the standard sample for DNA-1000 is subjected to the electrophoresis analysis using DNA-12000, each peak position is advanced as compared with the case where the standard sample for DNA-1000 is subjected to the electrophoresis analysis using DNA-1000. Therefore, it is possible to determine whether the combination of the standard sample and the separation buffer is correct by evaluating the position of each peak and the number of peaks in the electropherogram.

The examples described above are merely examples of embodiments of the microchip electrophoresis device according to the present invention. Embodiments of a microchip electrophoresis device according to the present invention are as follows.

An embodiment of a microchip electrophoresis device according to the present invention includes a sample setting section in which at least one sample to be subjected to electrophoresis analysis and at least one standard sample are set, at least one microchip having a flow path for electrophoresis therein, an introduction device that introduces a separation buffer, the sample, and the standard sample into the flow path in the microchip, a voltage application device that applies a voltage to the flow path in the microchip, a detector that acquires analysis data by electrophoresis analysis in the flow path of the microchip, and a controller that controls operations of the introduction device and the voltage application device, wherein the controller includes a standard data storage memory that stores standard data obtained by performing electrophoresis analysis of a standard sample under a predetermined condition, and a chip determination part configured to perform electrophoresis analysis of the standard sample under the predetermined condition using each of the at least one microchip before electrophoresis analysis of the sample set in the sample setting section is performed to acquire analysis data on the standard sample by the detector, and to perform a chip determination as to whether a state of each of the at least one microchip is suitable for performing electrophoresis analysis by comparing the acquired analysis data with the standard data on the standard sample.

In the first aspect of the embodiment, in the chip determination by the chip determination part, evaluation of a correlation between a peak position in analysis data acquired by electrophoresis analysis of the standard sample and a peak position in the standard data is performed. According to such an aspect, it is possible to detect a decrease in the performance of the microchip or an error such as a mistake in the combination of the standard sample and the separation buffer.

In the second aspect of the embodiment, in the chip determination by the chip determination part, comparison between the number of peaks in analysis data acquired by electrophoresis analysis of the standard sample and the number of peaks in the standard data is performed. According to such an aspect, it is possible to detect a decrease in the performance of the microchip or an error such as a mistake in the combination of the standard sample and the separation buffer. This second aspect can be combined with the first aspect.

In the third aspect of the above embodiment, the controller further includes an analysis performing part configured to perform, after the chip determination by the chip determination part is completed, electrophoresis analysis of the sample set in the sample setting section using a microchip determined, by the chip determination part, to be suitable for use in electrophoresis analysis. Such an aspect prevents electrophoresis analysis of the sample from being performed using a microchip that is not suitable for use in electrophoresis analysis. The third aspect can be combined with the first aspect and/or the second aspect.

In the third aspect, the controller further includes a schedule determining part configured to determine, after the chip determination by the chip determination part is completed, an analysis schedule so that electrophoresis analysis of the sample set in the sample setting section is performed using only a microchip determined, by the chip determination part, to be suitable for use in electrophoresis analysis, and the analysis performing part is configured to perform electrophoresis analysis of a sample according to the analysis schedule determined by the schedule determining part. According to such an aspect, when there is a microchip that is not suitable for use in electrophoresis analysis of a sample, an analysis schedule excluding such a microchip is automatically determined, so that it is not necessary for a user to create an analysis schedule, and a workload of the user is reduced.

DESCRIPTION OF REFERENCE SIGNS 2-1 to 2-4: microchip
4: sample setting section
6: separation buffer setting section
8: introduction device
10: voltage application device
12: detector
14: controller
16: standard data storage memory
18: chip determination part
20: schedule determining part
22: analysis performing part

What is claimed is:

1. A microchip electrophoresis device comprising:
a sample setting section in which at least one sample to be subjected to electrophoresis analysis and at least one standard sample are set;
at least one microchip having a flow path for electrophoresis therein;
an introduction device that introduces a separation buffer, the at least one sample, and the at least one standard sample into the flow path in the at least one microchip;
a voltage application device that applies a voltage to the flow path in the at least one microchip;
a detector that acquires analysis data by electrophoresis analysis in the flow path of the at least one microchip; and
a controller that controls operations of the introduction device and the voltage application device,
wherein the separation buffer is elected from multiple types of separation buffers, and there are multiple types of standard samples corresponding to each of the multiple types of separation buffers respectively,
wherein the at least one standard sample is selected from the multiple types of standard samples,
wherein an analysis schedule of a standard sample analysis of the at least one standard sample is registered in the controller,
wherein a type of standard sample and a type of separation buffer which are to be used in the standard sample analysis are included in the analysis schedule of the standard sample analysis,
wherein the controller includes:
a standard data storage memory that stores standard data obtained by performing electrophoresis analysis of the multiple types of standard samples under a predetermined condition using separation buffers corresponding to each of the analyzed standard samples, and
a chip determination part configured, according to the analysis schedule, to perform the standard sample analysis, in which the registered type of standard sample in the analysis schedule and the registered type of separation buffer in the analysis schedule are used, under the predetermined condition using each of the at least one microchip before electrophoresis analysis of the at least one sample set in the sample setting section is performed to acquire analysis data of the standard sample analysis, and to perform a chip determination as to whether the combination of the at least one standard sample and the separation buffer which are used in the standard sample analysis is suitable for use by comparing the acquired analysis data of the at least one standard sample with the standard data corresponding to the registered standard sample in the analysis schedule.

2. The microchip electrophoresis device according to claim 1, wherein in the chip determination by the chip determination part, evaluation of a correlation between a peak position in the analysis data acquired by the standard sample analysis and a peak position in the standard data is performed.

3. The microchip electrophoresis device according to claim 1, wherein in the chip determination by the chip determination part, comparison between the number of peaks in the analysis data acquired by the standard sample analysis and the number of peaks in the standard data is performed.

4. The microchip electrophoresis device according to claim 1, wherein the controller further includes an analysis performing part configured to perform, after the chip determination by the chip determination part is completed, the electrophoresis analysis of the at least one sample set in the sample setting section using the at least one standard sample and the separation buffer determined, by the chip determination part, to be suitable for use in the electrophoresis analysis of the at least one sample set in the sample setting section.

5. The microchip electrophoresis device according to claim 4, wherein
the controller further includes a schedule determining part configured to determine, after the chip determination by the chip determination part is completed, an analysis schedule so that the electrophoresis analysis of the at least one sample set in the sample setting section is performed using only the at least one standard sample and the separation buffer determined, by the chip determination part, to be suitable for use in the electrophoresis analysis of the at least one sample set in the sample setting section, and
the analysis performing part is configured to perform the electrophoresis analysis of the at least one sample according to the analysis schedule determined by the schedule determining part.

* * * * *